(12) United States Patent
Humiston et al.

(10) Patent No.: US 10,046,537 B2
(45) Date of Patent: Aug. 14, 2018

(54) POROUS MEMBRANES, MATERIALS, COMPOSITES, LAMINATES, TEXTILES AND RELATED METHODS

(71) Applicant: Celgard, LLC, Charlotte, NC (US)

(72) Inventors: Karl F. Humiston, Fort Mill, SC (US); Gerald P. Rumierz, Fort Mill, SC (US); Dickie J. Brewer, Clover, SC (US)

(73) Assignee: Celgard, LLC, Charlotte, NC (US)

( * ) Notice: Subject to any disclaimer, the term of this patent is extended or adjusted under 35 U.S.C. 154(b) by 0 days.

(21) Appl. No.: 14/037,845

(22) Filed: Sep. 26, 2013

(65) Prior Publication Data
US 2014/0093687 A1    Apr. 3, 2014

Related U.S. Application Data

(60) Provisional application No. 61/706,990, filed on Sep. 28, 2012.

(51) Int. Cl.
*B32B 3/28* (2006.01)
*B01D 69/12* (2006.01)
(Continued)

(52) U.S. Cl.
CPC .......... *B32B 3/28* (2013.01); *B01D 69/12* (2013.01); *D06C 23/04* (2013.01);
(Continued)

(58) Field of Classification Search
CPC .......... B32B 3/28; D06C 23/04; B01D 69/12; H01M 2/1606; H01M 2/1686; C08J 5/22; Y10T 428/24355; Y10T 428/24446
(Continued)

(56) References Cited

U.S. PATENT DOCUMENTS 3,260,778 A    7/1966  Walton
4,039,706 A    8/1977  Tajima et al.
(Continued)

FOREIGN PATENT DOCUMENTS

EP    1091035 A1    11/2001
JP    2002-506937 A    3/2002
(Continued)

OTHER PUBLICATIONS

Yoshino Akira, "Developing process and the latest trend for lithium ion battery technology in Japan," Chinese Journal of Power Sources, vol. 25, No. 6; (Dec. 2001); pp. 416-422.

*Primary Examiner* — Nathan L Van Sell
(74) *Attorney, Agent, or Firm* — Hammer & Associates, P.C.

(57) ABSTRACT

The present invention is directed to novel, improved, modified or treated microporous membranes for use in textile related applications and which are preferably composed of two or more dissimilar porous membrane or material layers laminated together using heat, compression and/or adhesives. The preferred inventive laminated composite microporous membrane is modified using a technique or treatment such as microcreping to introduce permanent small, regularly spaced, crepes, profiles, compactions, pleats, or wrinkles into the laminated composite microporous membrane for the purpose of improving mechanical strength, elasticity and/or resiliency. In addition, the inventive microcreped microporous laminated membrane more preferably has significantly improved 'hand' or softness, has 'next-to-the-skin' softness, and/or is quiet without crinkling noises during movement, which may be desired performance properties or characteristics of or in textile garments, materials or applications.

10 Claims, 2 Drawing Sheets

Drape/Softness of Nonwoven Membrane (1), Base Membrane (2) and Microcreped Inventive Membrane (3)

(51) Int. Cl.
*D06C 23/04* (2006.01)
*H01M 2/16* (2006.01)

(52) U.S. Cl.
CPC ....... *H01M 2/1606* (2013.01); *H01M 2/1686* (2013.01); *Y10T 428/24355* (2015.01); *Y10T 428/24446* (2015.01)

(58) Field of Classification Search
USPC ................. 428/141, 152; 264/103, 282–283; 442/327–330, 333, 334–346, 351–353, 442/356–361, 400, 401, 408, 415
See application file for complete search history.

(56) References Cited

U.S. PATENT DOCUMENTS

| | | | |
|---|---|---|---|
| 4,610,915 A * | 9/1986 | Crenshaw | B32B 38/08 128/849 |
| 5,666,703 A | 9/1997 | Walton et al. | |
| 5,678,288 A | 10/1997 | Walton et al. | |
| 5,998,692 A | 12/1999 | Gilding | |
| 6,114,595 A * | 9/2000 | Moore | A61F 13/512 428/116 |
| 6,187,138 B1 | 2/2001 | Neal et al. | |
| 2002/0104576 A1 | 8/2002 | Howland | |
| 2007/0054579 A1 | 3/2007 | Baker, Jr. et al. | |
| 2008/0036135 A1 | 2/2008 | Horn et al. | |
| 2008/0269366 A1* | 10/2008 | Shaffer | C08L 53/02 521/134 |
| 2008/0311343 A1* | 12/2008 | Kinn | D21H 25/005 428/137 |
| 2010/0300054 A1* | 12/2010 | Cole | A62D 5/00 55/524 |
| 2011/0151738 A1* | 6/2011 | Moore et al. | 442/334 |
| 2011/0186381 A1 | 8/2011 | Ogawa et al. | |
| 2011/0247184 A1* | 10/2011 | Jackson | A44B 18/0049 24/700 |

FOREIGN PATENT DOCUMENTS

| | | |
|---|---|---|
| JP | 2004-197287 A | 7/2004 |
| JP | 2008-540864 A | 11/2008 |
| JP | 2009-503279 A | 1/2009 |
| JP | 2009-235596 A | 10/2009 |
| JP | 2010-531367 A | 9/2010 |
| JP | 2011-084855 A | 4/2011 |
| WO | WO 94/16657 A1 | 8/1994 |
| WO | WO 2010/038491 | 4/2010 |

* cited by examiner

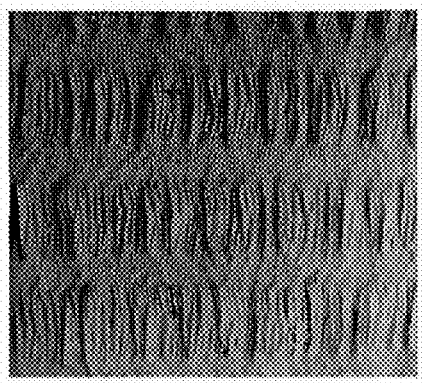

Figure 1. Photograph at 10x magnification of a fabric which has been microcreped from Micrex website. The flat portion is where the microcreping has taken place resulting in gathering of the remaining material.

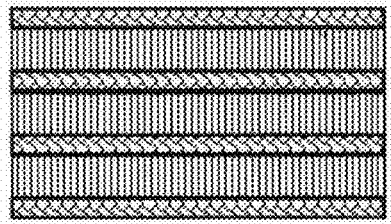

Figure 2. Schematic of surface appearance of Microcreped Celgard® Z-Series Microporouos Membrane.

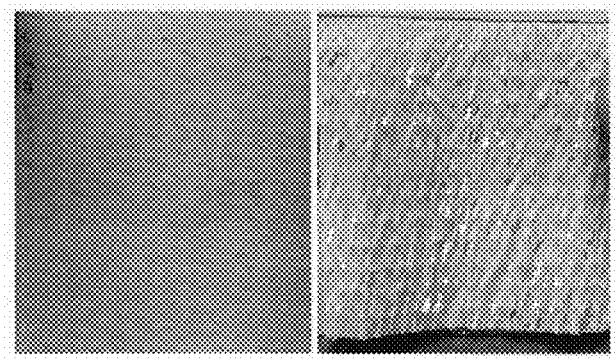

Figure 3. Photographs of side by side samples of Celgard® Z-Series Composite Microporous Membrane and Celgard® Z-Series Microcreped Composite Microporous Membrane before (on the left) and after (on the right) microcreping.

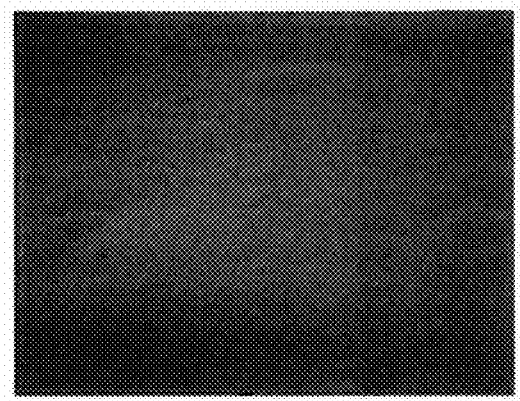
Figure 4. Photo of Microcreped EZL3030 Patent Example 2.
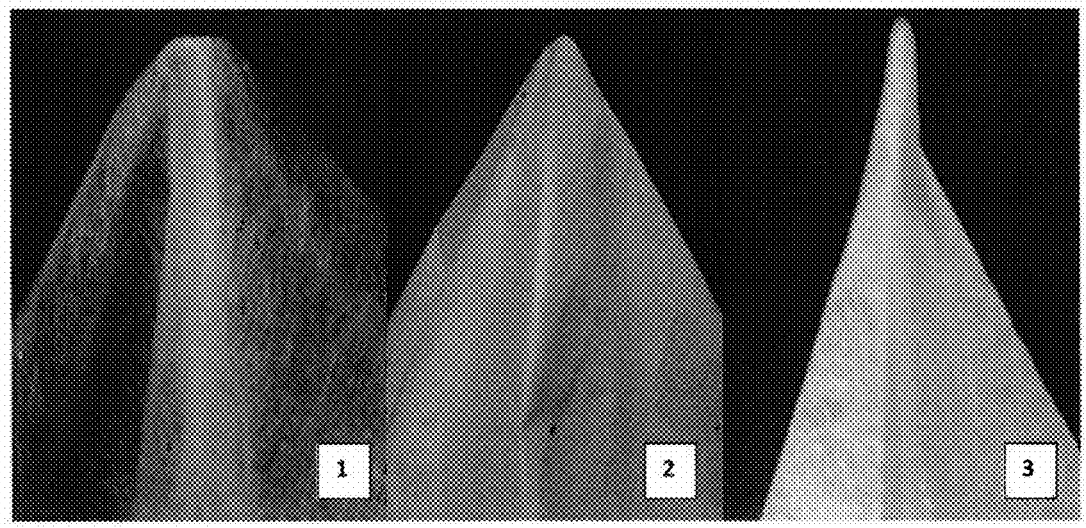
Figure 5. Drape/Softness of Nonwoven Membrane (1), Base Membrane (2) and Microcreped Inventive Membrane (3).

POROUS MEMBRANES, MATERIALS, COMPOSITES, LAMINATES, TEXTILES AND RELATED METHODS

CROSS-REFERENCE TO RELATED APPLICATIONS

This application claims the benefit of and priority to U.S. provisional patent application Ser. No. 61/706,990 filed Sep. 28, 2012, hereby incorporated by reference herein.

FIELD OF THE INVENTION

In accordance with at least selected embodiments, the present invention is directed to novel, improved, modified, or treated porous membranes, materials, composites, laminates, textiles, garments, textile materials, and related methods. In accordance with at least certain embodiments, the present invention is directed to novel, improved, modified, or treated microporous membranes for use in textile garments, textile materials or related applications. In accordance with at least certain selected embodiments, the present invention is directed to novel, modified or treated composite microporous membranes which are composed of two or more dissimilar porous membrane or material layers laminated together, for example, using heat, compression and/or adhesives. In accordance with at least particular selected embodiments, the laminated composite microporous membrane is modified using a technique or treatment such as microcreping to introduce permanent small, regularly spaced, crepes, profiles, compactions, pleats, or wrinkles into the laminated composite microporous membrane for the purpose of changing, modifying or improving certain characteristics or performance such as mechanical strength, elasticity and resiliency. In addition, the inventive novel, improved, modified, treated, or microcreped microporous laminated membrane may have significantly improved 'hand' or softness which is a desired characteristic or performance property in textile garments, materials or applications.

BACKGROUND OF THE INVENTION

Microporous membranes are commonly made of polyolefins and are used in numerous end use applications such as medical and industrial filtration, battery separator membranes, separation methods, deaeration, water and fluid purification, etc. Such membranes are available from Celgard, LLC of Charlotte, N.C. Due to their chemical nature, polyolefin microporous membranes are hydrophobic and repel water. While water in the liquid state is repelled by polyolefin porous membranes, water vapor molecules in their gaseous state are able to permeate into the porous structure of the membrane and pass through its pores.

Microporous membranes that are water impermeable and air permeable could be useful as materials for waterproof/breathable textile materials and apparel including footwear, as well as in certain industrial applications, such as building construction, where a combination of waterproofness and breathability may be desirable. Such membranes are available from Celgard, LLC of Charlotte, N.C.

A need exists for such membranes for at least certain uses or applications to not only have waterproofness and breathability, but also to have increased mechanical strength to withstand the rigors of repeated use, a degree of stretch and recovery to enhance wearer comfort or to improve the membrane's conformability to twists and bends, and/or to have improved 'hand' or drape.

SUMMARY OF THE INVENTION

At least selected embodiments, objects or aspects of the present invention address the above needs and/or are directed to novel, improved, modified, or treated porous membranes having in addition to waterproofness and breathability, greatly enhanced usefulness and scope of application, increased mechanical strength to withstand the rigors of repeated use, a degree of stretch and recovery to enhance wearer comfort or to improve conformability to twists and bends, and/or improved 'hand' or drape.

In accordance with at least selected embodiments, the present invention is directed to novel, improved, modified, or treated porous membranes, materials, composites, laminates, textiles, garments, textile materials, and related methods. In accordance with at least certain embodiments, the present invention is directed to novel, improved, modified, or treated microporous membranes for use in textile garments, textile materials or related applications. In accordance with at least certain selected embodiments, the present invention is directed to novel, modified or treated composite microporous membranes which are composed of two or more dissimilar porous membrane or material layers laminated together, for example, using heat, compression and/or adhesives. In accordance with at least particular selected embodiments, the laminated composite microporous membrane is modified using a technique or treatment such as microcreping to introduce permanent small, regularly spaced, crepes, profiles, compactions, pleats, or wrinkles into the laminated composite microporous membrane for the purpose of changing, modifying or improving certain characteristics or performance such as mechanical strength, elasticity and resiliency. In addition, the inventive novel, improved, modified, treated, or microcreped microporous laminated membrane may have significantly improved 'hand' or softness which is a desired characteristic or performance property in textile garments, materials or applications.

In accordance with at least selected embodiments, objects or aspects, the present invention is directed to novel, improved, modified, or treated microporous membranes for use in textile garments, textile materials or related applications, to novel, modified or treated composite microporous membranes which are composed of two or more dissimilar porous membrane or material layers laminated together, for example, using heat, compression and/or adhesives, to laminated composite microporous membranes modified using a technique or treatment such as microcreping to introduce small, regularly spaced, crepes, profiles, compactions, pleats, or wrinkles into the laminated composite microporous membrane for the purpose of changing, modifying or improving certain characteristics or performance such as mechanical strength, elasticity and resiliency, to treated or microcreped microporous laminated membranes having significantly improved 'hand' or softness which is a desired characteristic or performance property in textile garments, materials or applications, and/or the like.

The possibly preferred inventive laminated composite microporous membrane is modified using a technique or treatment such as microcreping which introduces preferably permanent, small, regularly spaced, crepes, profiles, compactions, pleats, or wrinkles into the membrane. The creping, pleating or folding of the microporous membrane produces a 3-D dimensionality to the architecture or profile of the membrane which preferably results in a marked increase in mechanical strength and in the level of stretch and recovery. In addition, treating or microcreping the laminated composite microporous membrane preferably creates a soft 'hand' or drape in the microporous membrane which is in contrast to the typical 'plastic'; rigid feel of certain polyolefin membranes. Unlike the stiff feel of an inexpensive plastic raincoat, the inventive microporous membrane preferably has 'next-to-the-skin' softness and is quiet without crinkling noises during movement.

Microcreping involves the introduction of permanent, tiny crepes or profiles into at least a portion of the structure of the porous membrane or film in a process which compresses the web or length of material to produce the crepes or profiles. This process may also be known as compaction. FIG. 1 shows an example of a textile fabric which has been microcreped, creating rows of microcreped areas which generated rows of gathering or wrinkles in adjacent areas of the fabric. Depending on the creping pattern, the microcreped material may appear to have striped areas of small crepes and larger gatherings or wrinkles laid out in a repeated parallel fashion.

While microcreping is known in the art (see, for example, U.S. Pat. Nos. 3,260,778, 5,666,703, and 5,678,288, and US Published Application US 2008/0036135 A1, each hereby incorporated by reference herein), the concept of microcreping the inventive microporous membranes, microporous composites or laminates, and microporous polymer membranes laminated to a non-woven material for use as a textile material is a differentiated, novel or improved concept and/or product for textile garments, materials and/or applications, and/or other end use applications.

One method of creping webs, commonly referred to as "microcreping," is described in U.S. Pat. No. 3,260,778 issued Jul. 12, 1966 to Richard R. Walton and entitled "Treatment of Materials" (and incorporated by reference herein). This U.S. Pat. No. 3,260,778 patent describes a method in which the web is supported on the surface of a rotating drum and lengthwise compressed in a treatment cavity defined by the surfaces of the rotating drum, a primary blade which presses the web against the rotating drum, and an inclined rigid retarder blade which retards the forward movement of the web and dislodges the web from the surface of the rotating drum. The treatment cavity prevents the web from buckling beyond the dimensions of the treatment cavity, causing a lengthwise or machine direction compression of the web which results in creping.

The microcreping of the present laminated composite microporous membrane introduces a three dimensional architecture into the structure of the membrane preferably resulting in a markedly increased level of mechanical strength and elasticity. Furthermore, the inventive microcreped microporous membranes have significantly improved 'hand' or softness depending on the degree of creping or compactness obtained in the microcreping process.

Polyolefin microporous membranes (such as Celgard® polyolefin microporous membranes of Celgard, LLC of Charlotte, N.C.) are typically waterproof due to the inherent hydrophobic nature of the carbon-hydrogen polymeric material they are composed of and the small pore size. While water in the liquid state is repelled by polyolefin microporous membranes, water vapor is able to permeate the microporous structure and pass through the pores of the membrane. The porous structure of a microporous membrane allows for the permeation and passage of molecules in their gaseous state through the membrane. Passage of gaseous substances in and out of the microporous membrane defines the air permeability and moisture vapor transmission performance of the membrane.

In accordance with at least selected embodiments, the present invention is related to microcreping composite microporous membranes which preferably include a first microporous polymer membrane laminated to a second porous membrane or material which is preferably a non-woven, more preferably a polymer non-woven, but can be one or more other polymeric porous membranes, or to a porous membrane previously coated with a material, such as a polymeric functional material, selected for strength, porosity and surface friction properties. A critical component of the success of microcreping a microporous polymer membrane, such as a Celgard® microporous polyolefin membrane which has been laminated to a porous polymer non-woven material or mesh, such as a polyolefin non-woven mesh, more specifically of a Celgard® Z-series (i.e. biaxially oriented) microporous polyolefin membrane product laminated to a porous polyolefin non-woven material, can be due in part to the difference in the friction properties of the two porous membranes or materials (for example, the polymer membrane and polymer non-woven each have different friction properties), to the unevenness, grip or friction properties of the non-woven material (for example, the polymer non-woven), or the like. FIG. 3 shows side by side photographs of a Z-series Celgard membrane EZL2090 before and after microcreping. Because the lamination procedure involves heat, the lamination diamond pattern in the EZL2090 creates distinct porous and nonporous area in the membrane. Although this diamond lamination pattern may be preferred, the present invention is not limited to any particular lamination pattern or creping pattern.

In addition to microcreping, fabric softness can be enhanced through, for example: material selection; embossing such as to create a pillowing effect; selecting lamination techniques, such as adhesive and/or low-temperature lamination, that maximize softness; subjecting the laminate (or at least the outer surface or layer) to mechanical working/beating; laminating softer materials on one or both outer surfaces; and/or treating the laminate (or at least the outer surface or layer) with fabric softening finishes.

The resulting inventive microcreped microporous membrane produced through the microcreping process may offer a range of differentiated textile materials with waterproof/breathable performance properties.

The resulting inventive microcreped or softened novel, improved, modified, or treated porous membranes, materials, composites, laminates, textiles, garments, textile materials, microporous membranes, materials, composites, laminates, textiles, garments, textile materials, composite microporous membranes which are composed of two or more dissimilar porous membrane or material layers, laminated composite microporous membranes, and/or the like may offer a range of differentiated materials, textile materials or the like, preferably with waterproof/breathable performance properties.

BRIEF DESCRIPTION OF THE DRAWINGS

FIG. 1 is a photographic image at 10× magnification of a fabric which has been microcreped. The flat portion is where the microcreping has taken place resulting in gathering of the remaining material. Photo from Micrex Corporation website www.micrex.com.

FIG. 2 is a schematic representation of the surface appearance of microcreped Celgard® Z-Series Microporous Membrane.

FIG. 3 includes side by side photographic images of samples of Celgard® Z-Series Composite Microporous Membrane and Microcreped Celgard® Z-Series Composite Microporous Membrane showing the before (on the left) and after (on the right) microcreping in accordance with one embodiment of the invention.

FIG. 4 is a photograph of Example 2 EZL3030 Microcreped Composite Microporous Membrane.

FIG. 5 is a series of photographs (1-3) showing the drape/softness/hand of the Nonwoven Membrane (1), Microporous Base Membrane (2) and the Inventive Microcreped Microporous Membrane (3).

DETAILED DESCRIPTION OF THE INVENTION

In accordance with at least certain possibly preferred embodiments, the present invention is directed to novel, modified or treated microporous membranes for use in textile related and other applications. In accordance with selected possibly preferred embodiments, the present invention is directed to novel, modified or treated composite microporous membranes composed of two or more dissimilar porous membrane or material layers laminated together using heat, compression, ultrasonic bonding and/or adhesives. In accordance with at least certain possibly preferred particular embodiments, a laminated composite microporous membrane composed of two or more dissimilar porous membrane or material layers laminated together is modified using a technique or treatment such as microcreping to introduce preferably permanent small, regularly spaced, crepes, profiles, compactions, pleats or wrinkles into the laminated composite microporous membrane for the purpose of improving mechanical strength, elasticity and/or resiliency. In addition, the inventive modified, treated or microcreped laminated composite microporous membrane has significantly improved 'hand' or softness, 'next-to-the-skin' softness, and/or is quiet or without crinkling noises during movement, each of which is a desired performance property in textile garments, materials or applications.

As one example, Micrex Corporation of Walpole, Mass. is the developer of a series of machine configurations known as Micrex®/Microcrepers™ which impart microcrepes of various patterns on traveling material lengths or webs.

The creping or microcreping of the laminated composite microporous membrane introduces a three dimensional architecture into the structure of the membrane preferably resulting in a markedly increased level of mechanical strength and elasticity. Furthermore, the inventive microcreped microporous membrane can have significantly improved 'hand' or softness depending on the degree of creping or microcreping or compactness obtained in the creping or microcreping process.

Polyolefin microporous membranes are waterproof due to the inherent hydrophobic nature of the carbon-hydrogen polymeric material they are composed of and the small pore size. While water in the liquid state is repelled by polyolefin microporous membranes, water vapor is able to permeate the porous structure and pass through the micropores of the membrane. The porous structure of a microporous membrane allows for the permeation and passage of molecules in their gaseous state through the membrane. Passage of gaseous substances in and out of the porous membrane defines the air permeability and moisture vapor transmission performance of the membrane.

In accordance with at least selected embodiments, the present invention is related to microcreping laminated composite microporous membranes which include a first polymer microporous membrane which has been laminated, bonded, joined, or adhered to a second porous membrane or material which is preferably a non-woven fabric, but can be one or more other polymeric porous membranes or a porous membrane previously coated with a polymeric functional material selected for strength, porosity and surface friction properties, or a woven or knit porous fabric.

A possibly critical component of the success of microcreping porous membranes, such as Celgard® porous membranes which have been laminated to a non-woven layer, material or fabric, more specifically of a Celgard® Z-series PO, PP, PE, or PP/PE/PP microporous membrane product laminated to a Polyolefin (PO) non-woven material, can be due in part to the difference in the friction properties of the respective outer surfaces of the porous membrane and non-woven fabric, the friction properties of the outer surface of the non-woven fabric, or the like. In accordance with at least one embodiment, the inventive membrane can also be laminated to a woven fabric comprised of nylon, PET, PP, cotton, rayon, acrylic, or other material or combination of materials. In accordance with at least one embodiment, the inventive membrane can also be laminated between two layers of non-woven, between a layer of non-woven and a layer of woven fabric, or between two layers of woven fabric and bonded together thermally, ultrasonically, or with adhesive. In accordance with at least one embodiment, the inventive microcreped composite microporous membrane can consist of a single layer microporous membrane which has one surface modified to alter its frictional properties as needed for successful microcreping.

The resulting inventive microcreped microporous membrane produced through compaction or microcreping offers a range of differentiated textile materials with waterproof/breathable performance properties. Examples of possible industrial textile related end uses of the inventive microcreped microporous membrane include flexible packaging, sound insulation, construction barrier films, cushioning applications, and increased surface area film for filtration and/or gas diffusion applications. Examples of possible textile related garment applications include disposable and/or reusable medical garments, clean room suits, outdoor textile materials, outdoor clothing or gear, footwear, etc.

The resulting levels of strength, stretch, recovery, stretch and recovery, resiliency, flexibility, and softness may be controlled by varying the degree of creping or compaction, for example, compaction or microcreping of at least a portion of the membrane in the machine direction. Adjustment of compaction or creping parameters such as speed, pressure and temperature, may regulate the achieved level of mechanical strength, stretch and recovery, resiliency, and soft hand of the microcreped porous membrane. Higher compaction may produce a more dense, microcreped material with higher resiliency, that is, recoverable machine direction stretch. The soft hand or softness of the microcreped membrane, the ability of the creped material to hang or droop, and the like is created by the parallel rows of microcreped areas or lands and the adjacent gathers in the membrane shown in, for example, FIGS. 2 and 3. The drape and softness of the inventive microcreped microporous membrane (3) is shown in FIG. 5 as compared to the component non-woven (1) and base porous membranes (2). This example demonstrates that two soft, easily draped membranes can be microcreped to produce the inventive microporous membrane where the drape and softness are retained or even improved.

Microcreping of Celgard® polyolefin microporous membranes, more specifically to Celgard® Z-series microporous membrane products laminated to a non-woven material, provides a highly breathable, waterproof, resilient material useful for garment applications such as outerwear, rainwear, waterproof footwear, hunting and motorcycle gear, surgical garments, etc. and also useful for textile outdoor applications which use tenting and awning materials, etc.

EXAMPLES

The below, Table 1 lists the properties of a microcreped Celgard® laminated product Example 1, together with properties of the composite materials used to produce the microcreped Celgard laminated product. Example 1 was processed through the Micrex® Corporation microcreping process according to specification number C2000. FIG. 3 includes before and after photographs of one embodiment of the inventive Celgard Z-Series EZL2090 microcreped composite microporous membrane.

TABLE 1

Properties of Microcreped Celgard ®Z-Series EZL2090 Composite Microporous Membrane.

| Property | Nonwoven PP Fabric | EZ2090 (PP membrane) | EZL2090 (composite of membrane and nonwoven) | Microcreped EZL2090 |
|---|---|---|---|---|
| Thickness, um | 130 | 20 | 83 | 263 |
| Basis weight, g/m2 | 15 | 6 | 19 | 44 |
| ASTM Gurley, sec/10 cc | <1 | 3 | 2 | 47 |
| Puncture Strength, kg | 113 | 288 | 511 | 621 |
| % Strain at Load PS test | 5.1 | 3.7 | 3.9 | 5.6 |
| MD Stress at break, kgf/cm² | 47 | 903 | 267 | 88 |
| TD stress at break | 27 | 609 | 159 | 74 |
| % MD Elongation at break | 50 | 106 | 89 | 193 |
| Recoverable MD after 100% extension and release by hand | none | none | very little | All |

Example 1

Celgard® EZ2090 Z series polypropylene (PP) microporous membrane was thermally laminated using a diamond diagonal surface pattern to a nonwoven polypropylene (PP) fabric with a basis weight of 15 g/m². The resulting product EZL2090 was microcreped using the Micrex® Corporation microcreping process according to specification number C2000 at a temperature of about 150 degrees F. and a pressure of about 40 psi. Microcreping of a 83 pm EZL2090 composite of a 130 μm nonwoven PP fabric to a 20 μm microporous Celgard® EZ2090 produced a 263 μm thick microcreped composite microporous membrane with a basis weight of 44 g/m². This inventive microcreped composite membrane had an approximately 20% increase in puncture strength and 100% increase in MD elongation at break when compared to the non-microcreped EZL2090. After a test sample of the microcreped composite membrane was elongated to full extension and released, recovery was nearly 100%. A low Gurley value of 47 sec/10 cc is indicative of the high air permeability of the inventive microcreped composite membrane.

Example 2

Celgard® EZ3030 18 μm polypropylene (PP) microporous membrane was thermally laminated using a dot surface pattern to a 106 μm nonwoven polypropylene (PP) fabric with a basis weight of 11.7 g/m². Microcreped EZL3030 shown in FIG. 4 was prepared using the Micrex® Corporation microcreping process according to specification number C2000 at a temperature of about 150 degrees F. and a pressure of about 40 psi. The inventive microcreped EZL3030 was 159 μm thick and had approximately a 30% increase in puncture strength when compared to the puncture strength of the composite layers. The zero Gurley value observed for the microcreped EZL3090 is indicative of the very high air permeability. In addition, a 60% increase in the % Strain at load measured during puncture strength testing was observed indicating an increase in extensibility or stretch under load for the microcreped membrane.

TABLE 2

Properties of Microcreped Celgard ® EZL3030 Composite Microporous Membrane

| Property | Nonwoven PP Fabric | EZ3030 (PP membrane) | Microcreped EZL3030 |
|---|---|---|---|
| Thickness, um | 106 | 17.7 | 159 |
| Basis weight, g/m2 | 11.7 | 5.3 | 21.6 |
| ASTM Gurley, sec/10 cc | 2 | 1 | 0 |
| Puncture Strength, kg | 143 | 128 | 393 |
| % Strain at Load PS test | 5.7 | 5.2 | 7.3 |
| MD Stress at break, kgf/cm² | 37.5 | 617.5 | 58.3 |
| % Strain at Break | 55.9 | 86.5 | 49.7 |

Test Methods

Gurley is measured by the ASTM D-726 method and is a gas permeability test measured using the Gurley Densometer Model 4120 permeability tester. ASTM Gurley is the time in seconds required for 10 cc of air to pass through one square inch of film at a constant pressure of 12.2 inches of water.

Thickness is measured in micrometers, μm, using the Emveco Microgage 210-A micrometer thickness tester and test procedure ASTM D374.

MD Tensile strength is measured using Instron Model 4201 according to ASTM-882 procedure.

% MD elongation at break is the percentage of extension of a test sample measured at the maximum tensile strength needed to break a sample.

Puncture Strength is measured using Instron Model 4442 based on ASTM D3763. The measurements are made across the width of the microporous membrane and the puncture strength defined as the force required to puncture the test sample.

Basis Weight the weight per unit sample area of a material and can be expressed in grams/meter squared. It is the weight in grams of a test sample of known area in meters squared.

Films, especially thin films, are thought to be the most difficult materials to handle, microcrepe, compact, or the like. The thin porous membranes or porous films of the present invention (for example, 5 to 50 um thick microporous membranes) may be even harder to handle than solid films, but may better receive microcreping or compacting than solid films as the about 10% or more porosity, preferably about 30% or more porosity, and more preferably about 50% or more porosity, may facilitate creping. The thin composite or laminated porous membranes of the present invention (for example, 15 to 500 um thick composite microporous membranes or laminates) may be easier to handle due to the non-woven or fabric layer.

In accordance with at least certain embodiments, this invention relates to longitudinal treatment of thin porous materials, especially porous materials formed of a microporous membrane and a non-woven joined thereto, for the purpose of microcreping, compacting, to soften, to make stretchy, etc.

In at least certain microcreping, the thin, flexible, elongate porous material (length, web, sheet) is fed against a retarding means, is confined against a drive surface and on the same side of the material as the confining surface engaging it with a retarding surface, is subjected to a continuous longitudinal compressive treatment of a running length of the flexible material by pressing it by means of a pressing assembly into driven engagement with a moving drive surface, the pressing assembly providing a confining surface and a retarding surface both opposed to the drive surface and the retarding surface positioned beyond the confining surface so that the material passes between the retarding and drive surfaces after it exits from beneath the confining surface, and wherein the pressing assembly comprises (1) a presser member and (2) coupling means for transmitting the force of the presser member to the material, and the coupling means comprises (1) confining means defining the confining surface, (2) retarding means positioned at least in part beyond the confining means and defining the retarding surface and (3) force transmitting means between the presser member and the confining and retarding means, the presser member and coupling means are mounted for movement relative to each other longitudinally of the moving drive surface, means are provided for effecting such relative movement while said presser member is in pressing engagement with said coupling means, and the coupling means are so disposed and arranged with respect to the presser member as, during such relative movement in one direction, progressively to force the retarding surface closer to the moving drive surface from a relatively remote, ineffective position to positions closer to such surface to increase progressively the retarding effect of the retarding surface on a material driven by the drive surface, and, during this same relative movement, to transmit sufficient force to the confining surface to maintain material beneath it in non-slipping, driven engagement with the drive surface to the vicinity of the commencement of the retarding surface, the flexible material is caused to travel with the drive surface without slippage to a point close to but under the confining surface, in advance of the point where the retarding surface begins, between these points (generally less than an inch, and in the case of thin fabrics, less than ¼ inch), the material is slippably confined to a restricted thickness, delivery by the drive surface to the first point forces the material to immediately compress in its own plane against a confined column of compressed material prior to reaching the retarding surface, the retarding surface is inextensible and after adjustment is fixed in the direction of travel of the material; on the other hand it is preferably resiliently yieldable in the direction of thickness of the material, preferably the retarding surface is comprised of a multiplicity of material gripping projections having an aggregate retarding effect (e.g. hard grit grains bonded to a non-extensible backing sheet or projections of hard metal), and/or the like.

The present invention is not limited to any particular lamination or creping pattern, process, equipment, or the like. Micrex®/Microcrepers™ creping equipment and a Plisse pattern may be preferred. As a very rough generalization of prior thinking—textiles will accept the widest range of creping patterns, followed by nonwovens, less so paper, and lastly—films. Microcrepes can be described in terms of their frequency as well as amplitude, and can range from Very Fine, to Fine, to Medium, to Large, or the like. As a general rule in creping, it is easier to produce a pattern which is coarse than one which is fine. One can also use two levels of crepe, or microcrepe in narrow bands to create a plisse effect. Plisse patterns can easily be modified on the machine with little or no downtime or wasted material, for example, the new pattern device is cut with scissors from a piece of blue steel. Other patterns include a "skip" pattern, a "seersucker" pattern, a "double crepe" meaning both fine and coarse microcrepe, etc. In addition to microcreping, compacting, or creping, the thin flexible porous materials of the present invention may be embossed, perforated, scored, flocked, scavengered, brushed, corduroyed, printed, gravure printed, rolled, ribbed, beat, surface raised, heat set, sueded, folded, roll folded, pleated, undulated, waved, and/or the like, on one or both surfaces, combinations thereof, on one or both surfaces, and/or the like.

At least selected embodiments, objects or aspects of the present invention are directed to novel, modified or treated microporous membranes for use in textile related applications and which are preferably composed of two or more dissimilar porous membrane or material layers laminated together using heat, compression and/or adhesives. The preferred inventive laminated composite microporous membrane is modified using a technique or treatment such as microcreping to introduce permanent small, regularly spaced, crepes, profiles, compactions, pleats, or wrinkles into the laminated composite microporous membrane for the purpose of improving mechanical strength, elasticity and/or resiliency. In addition, the inventive modified, treated or microcreped microporous laminated membrane more preferably has significantly improved 'hand' or softness, has 'next-to-the-skin' softness, and/or is quiet without crinkling noises during movement, which may be desired performance properties or characteristics of or in textile garments, materials or applications.

At least selected embodiments of the present invention are directed to novel, improved, modified or treated microporous membranes for use in textile related applications and which are preferably composed of two or more dissimilar porous membrane or material layers laminated together using heat, compression and/or adhesives. The preferred inventive laminated composite microporous membrane is preferably improved, treated or modified using a technique or treatment such as microcreping to introduce permanent small, regularly spaced, crepes, profiles, compactions, pleats, or wrinkles into the laminated composite microporous membrane for the purpose of improving mechanical strength, elasticity and/or resiliency. In addition, the inventive microcreped microporous laminated membrane more preferably has significantly improved 'hand' or softness, has 'next-to-the-skin' softness, and/or is quiet without crinkling noises during movement, which may be desired performance properties or characteristics of or in textile garments, materials or applications.

At least certain embodiments, objects or aspects of the present invention are directed to microcreped or softened novel, improved, modified, or treated porous membranes, materials, composites, laminates, textiles, garments, textile materials, microporous membranes, materials, composites, laminates, textiles, garments, textile materials, composite microporous membranes which are composed of two or more dissimilar porous membrane or material layers laminated together, laminated composite microporous membranes produced through the microcreping process may offer a range of differentiated textile materials with waterproof/breathable performance properties.

In accordance with at least selected embodiments, objects, or aspects, the present invention is directed to novel, improved, modified, or treated porous membranes, materials, composites, laminates, textiles, garments, textile materials, and related methods. In accordance with at least certain embodiments, the present invention is directed to novel, improved, modified, or treated microporous membranes for use in textile garments, textile materials or related applications. In accordance with at least certain selected embodiments, the present invention is directed to novel, modified or treated composite microporous membranes which are composed of two or more dissimilar porous membrane or material layers laminated together, for example, using heat, compression and/or adhesives. In accordance with at least particular selected embodiments, the laminated composite microporous membrane is modified using a technique or treatment such as microcreping to introduce permanent small, regularly spaced, crepes, profiles, compactions, pleats, or wrinkles into the laminated composite microporous membrane for the purpose of changing, modifying or improving certain characteristics or performance such as mechanical strength, elasticity and resiliency. In addition, the inventive novel, improved, modified, treated, or microcreped microporous laminated membrane may have significantly improved 'hand' or softness which is a desired characteristic or performance property in textile garments, materials or applications.

The present invention is directed to novel, improved, modified or treated microporous membranes for use in textile related applications and which are preferably composed of two or more dissimilar porous membrane or material layers laminated together using heat, compression and/or adhesives. The preferred inventive laminated composite microporous membrane is modified using a technique or treatment such as microcreping to introduce permanent small, regularly spaced, crepes, profiles, compactions, pleats, or wrinkles into the laminated composite microporous membrane for the purpose of improving mechanical strength, elasticity and/or resiliency. In addition, the inventive microcreped microporous laminated membrane more preferably has significantly improved 'hand' or softness, has 'next-to-the-skin' softness, and/or is quiet without crinkling noises during movement, which may be desired performance properties or characteristics of or in textile garments, materials or applications.

Many other modifications and variations of the present invention are possible to the skilled practitioner in the field in light of the teachings herein. For example, although preferred to be porous or microporous, the membrane may be coated with a non-porous, porous or microporous coating or layer. It is therefore understood that, within the scope of the claims, the present invention can be practiced other than as herein specifically described.

What is claimed is:

1. A microcreped composite microporous vapor permeable membrane comprising:
   a laminated composite vapor permeable microporous membrane comprising a microporous membrane film laminated to a polyolefinic woven or nonwoven porous material, the microporous membrane film is dissimilar to the woven or nonwoven porous material, the membrane film consisting essentially of polyolefin, the microporous membrane film has an average diameter of the pores in the range 0.02 to 0.20 µm, the laminated composite microporous membrane has regularly spaced crepes, profiles, compactions, pleats, or wrinkles,
   the microcreped composite microporous membrane has a recovery of between 20 to 100% after extension.

2. The microcreped composite microporous membrane of claim 1 wherein one or more layers of a nonwoven fabric has been thermally, ultrasonically or with the use of adhesives laminated to the microporous polyolefinic membrane film prior to any modification, treatment or microcreping.

3. The microcreped composite microporous membrane of claim 1 wherein machine direction stretch can be up to 200%.

4. The microcreped composite microporous membrane of claim 1 wherein the microporous membrane film is water impervious.

5. A textile or garment comprising the microcreped composite microporous membrane of claim 1.

6. The microcreped composite membrane of claim 1 wherein the polyolefinic woven or nonwoven porous material is a polypropylene woven or nonwoven porous material.

7. A microcreped microporous vapor permeable membrane comprising:
   a microporous vapor permeable membrane film having permanent, regularly spaced crepes, profiles, compactions, pleats, or wrinkles, the membrane film consisting essentially of polyolefin, the microporous membrane film has an average diameter of the pores in the range 0.02 to 0.20 µm, and
   a polyolefinic woven or nonwoven porous material laminated to the microporous membrane film,
   the microcreped microporous membrane film has a recovery of between 20 to 100% after extension.

8. The microcreped microporous membrane of claim 7 wherein the microcreped microporous membrane film has at least two of: improved puncture strength, increased % MD elongation at break, improved level of stretch and recovery, improved resiliency, and has a soft hand or drape as compared to non-microcreped microporous membranes.

9. A textile or garment comprising the microcreped microporous membrane of claim 7.

10. The microcreped composite membrane of claim 7 wherein the polyolefinic woven or nonwoven porous material is a polypropylene woven or nonwoven porous material.

* * * * *